United States Patent

[11] 3,607,572

| [72] | Inventor | Leif G. Jorgensen<br>517 W. St. Charles Road, Lombard, Ill. 60148 |
|---|---|---|
| [21] | Appl. No. | 690,477 |
| [22] | Filed | Dec. 14, 1967 |
| [45] | Patented | Sept. 21, 1971 |

[54] TAPE-APPLYING MECHANISM
15 Claims, 12 Drawing Figs.

[52] U.S. Cl. ................................................. 156/505,
156/304, 156/512, 156/522
[51] Int. Cl. ..................................................... B32b 31/18,
B31f 5/06
[50] Field of Search .......................................... 156/304,
349, 502–512, 517–522, 580

[56] References Cited
UNITED STATES PATENTS
| 3,167,466 | 1/1965 | Lapersonne ................. | 156/505 |
| 3,450,589 | 6/1969 | Jorgensen ................. | 156/505 |
| 2,449,686 | 3/1950 | Selmin ................. | 156/505 |
| 2,539,611 | 1/1951 | Daniel et al. ................. | 156/505 |
| 2,827,104 | 3/1958 | Rives ................. | 156/505 |
| 3,123,513 | 3/1964 | Snyder ................. | 156/522 |
| 3,394,040 | 7/1968 | Baumbach ................. | 156/505 |

Primary Examiner—Samuel W. Engle
Assistant Examiner—James M. Hanley
Attorney—Richard W. Carpenter ABSTRACT: A device for applying a strip of adhesive tape to an article comprising: a base having a platform for holding the article; a carriage movable laterally on the base; an operating member pivoted to the carriage having means for carrying, dispensing, and cutting the tape; means for releasing the operating member and cutting means from inoperative positions; and means for releasing the locking means responsive to predetermined lateral movement of the operating member and carriage.

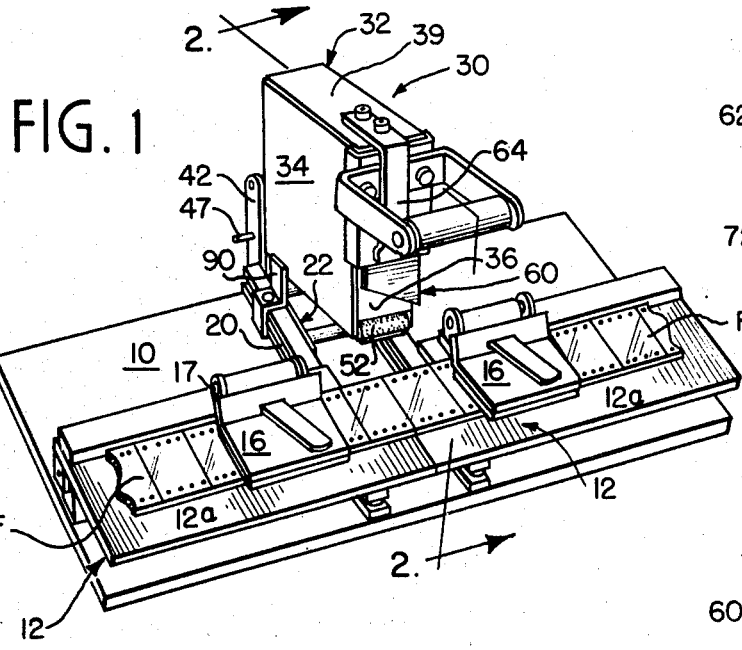
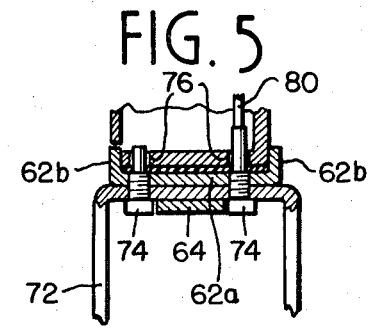
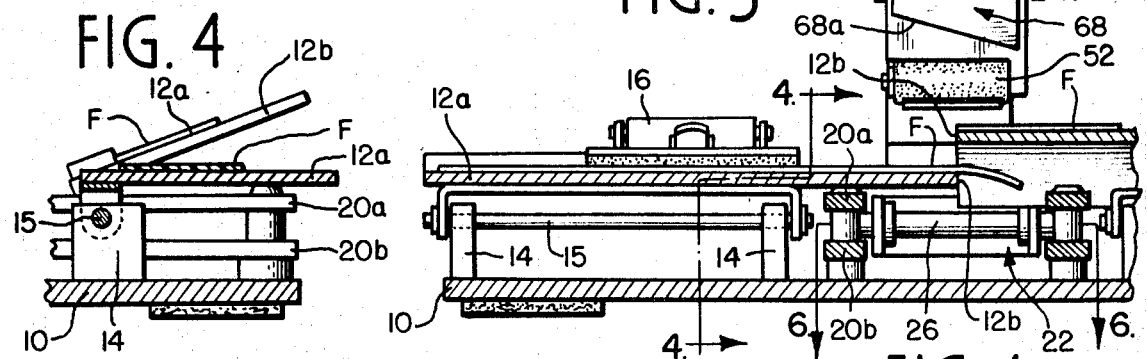
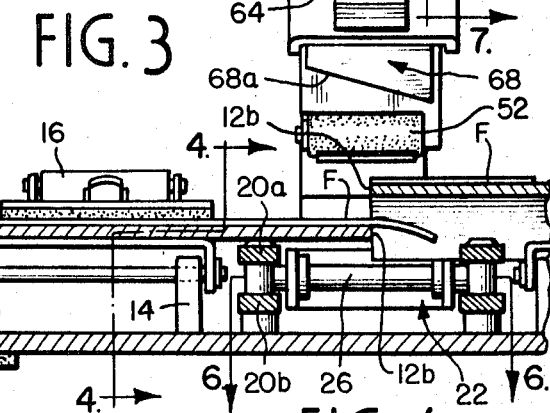
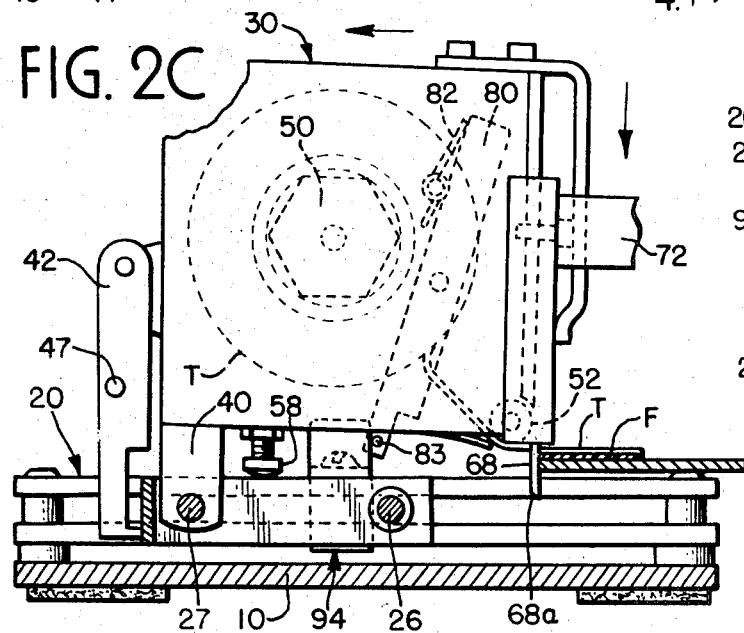
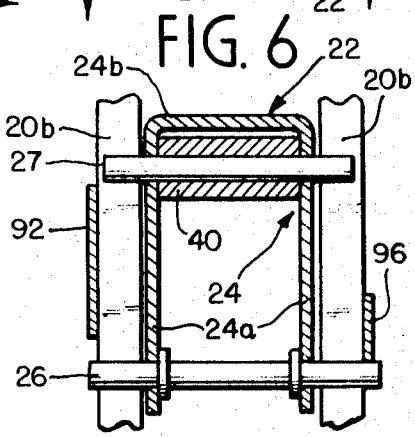
INVENTOR.
Leif G. Jorgensen
BY Richard W Carpenter
Attorney

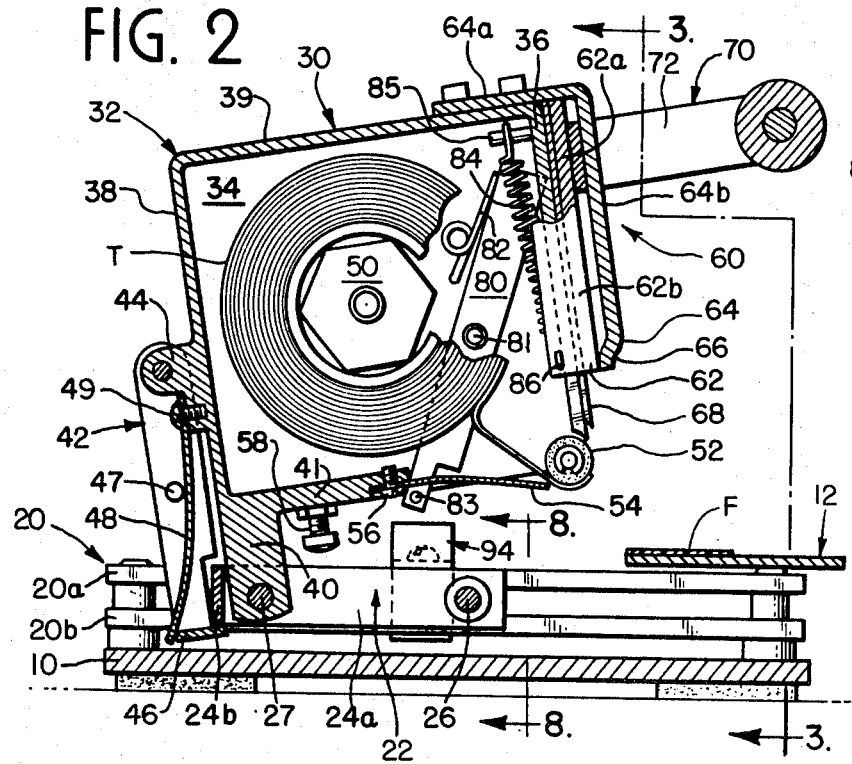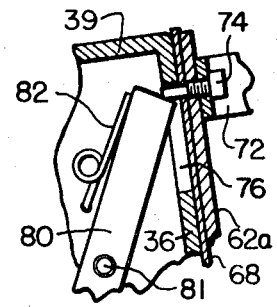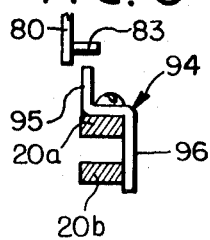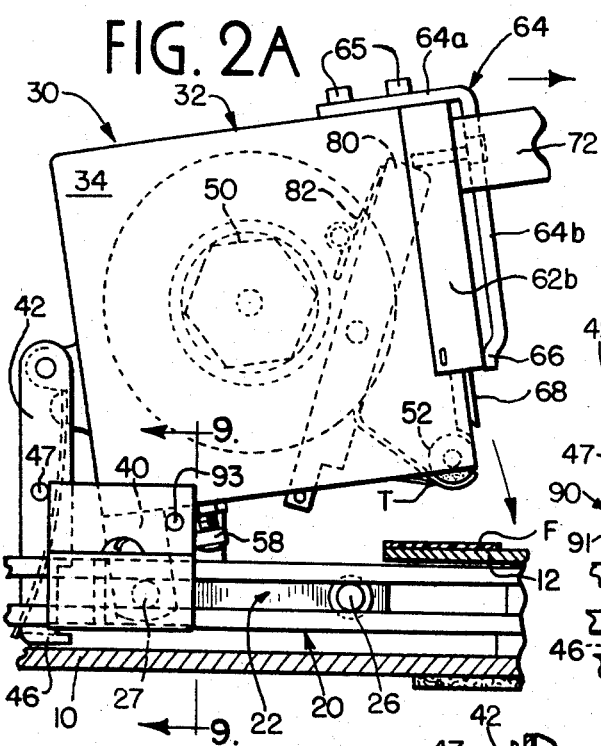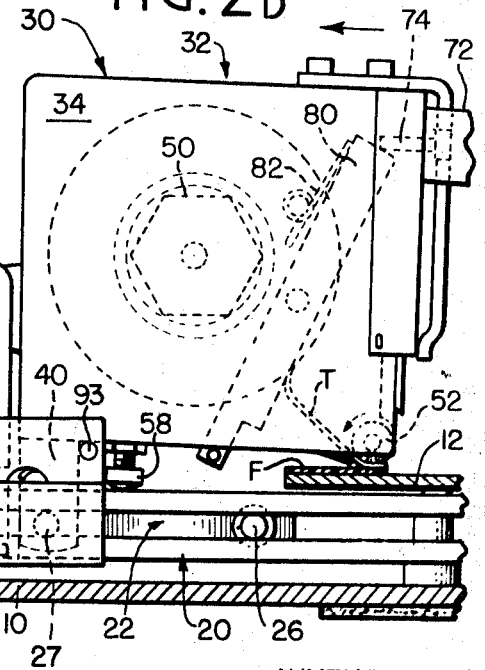

TAPE-APPLYING MECHANISM

BACKGROUND OF THE INVENTION

This invention relates to mechanisms for applying a predetermined length of adhesive tape to articles for various purposes such as in splicing abutting ends of film strips.

An object of the invention is the provision, in a device of the type described, of a mechanism which can be readily adapted to dispense and apply from roll stock strips of adhesive tape of various predetermined lengths.

A more specific object of the invention is to provide, in a device of the type described, a tape holding, dispensing, applying, and cutting mechanism pivotally mounted for vertical movement on a carriage which is in turn, mounted for lateral movement on a base having an article holding platform.

These and other objects of the invention will be apparent from an examination of the following description and drawings, wherein:

FIG. 1 is a perspective view of a film splicing device which includes a tape applying mechanism embodying features of the invention;

FIGS. 2A, 2B, and 2C are vertical sections taken on line 2—2 of FIG. 1, showing the mechanism in various positions of its operating cycle;

FIG. 3 is a fragmentary vertical section taken on line 3—3 of FIG. 1;

FIG. 4 is a vertical section taken on line 4—4 of FIG. 2;

FIGS. 5 and 6 are horizontal sections taken on lines 5—5 and 6—6, respectively, of FIG. 3;

FIG. 7 is a vertical section taken on line 7—7 of FIG. 3;

FIG. 8 is a vertical section taken on line 8—8 of FIG. 1; and

FIG. 9 is a vertical section taken on line 9—9 of FIG. 2A.

It will be understood that, for purposes of clarity, certain elements have been intentionally omitted from certain views where they are illustrated to better advantage in other views.

Referring now to the drawings, and particularly to FIG. 1, it will be seen that a film-splicing device having a tape-applying mechanism embodying features of the invention includes a preferably flat, horizontally disposed base 10 which has mounted thereon, adjacent the forward side thereof, a longitudinally extending platform or deck 12.

Platform 12 includes a pair of similar sections 12a which present flat upper surfaces for holding the film to which the tape is to be applied. Sections 12a have adjacent edges 12b which are flat and have sharp corners so as to cooperate in a scissor action for severing the film in a manner hereinafter described.

Sections 12a are pivotally mounted to one or more supports 14, which are in turn secured to the base.

Sections 12a also each include a clamping device 16 for releasably holding the film on the platform.

Mounted centrally on base 10 and disposed to extend from front to rear of the base is a carriage track, indicated fat 20, which includes cooperating pairs of upper and lower rails 20a and 20b, respectively, which are spaced from but parallel to each other.

Mounted for rolling movement forward and backward on track 20 is a carriage 22 which, as best seen in FIG. 6, includes a generally U-shaped frame 24 comprising a rear transverse element 24b and a pair of integral longitudinal side elements 24a within which are journaled a pair of front and rear rollers 26 and 27, respectively, the ends of which are disposed between the upper and lower rails of track 20.

Hingedly attached to carriage 22 for pivotal movement thereon and longitudinal movement therewith is an operating member, indicated generally at 30, which includes a hollow housing 32.

Housing 32 includes a pair of opposed sidewalls 34, a front wall 36, a rear wall 38, and a top wall 39 which are interconnected to form a boltlike enclosure partially open at the bottom. If desired the housing may be formed as a four-sided casting with the front, rear, top and one sidewall being integrally formed and with one sidewall being removably attached to the other walls to provide easy access to the interior of the housing.

Depending from the rear of housing 32 is a preferably integrally formed, vertically extending generally L-shaped support arm 40, the lower end of which, as best seen in FIGS. 2 and 6, is pivotally mounted on rear carriage roller 27 to accommodate pivotal movement of the housing relative to the carriage in a vertical plane parallel to track 20.

Pivotal movement of the carriage relative to the carriage is limited, however, by a vertical latch or lock bar 42 the upper end of which is pivotally connected to and ear 44 on the rear wall 38 of the housing. At its lower end lock bar 42 is provided with a preferably integral, forwardly extending foot 46 which, as best seen in FIG. 2, is adapted to engage rear element 24b of the carriage frame. Intermediate its ends lock bar 42 is provided with a cam pin 47 which, as hereinafter described, serves to release the lock bar foot from the carriage under certain operating conditions.

Normally lock bar 42 may be biased into the locked position by means of a generally vertically disposed leaf spring 48 the upper end of which is secured to housing 42 by a screw 49 and the lower end of which engages the rear surface of lock bar foot 46.

Within the housing a roll of adhesive tape T may be mounted on a spindle 50 extending transversely of the housing. Mounted on the lower front corner of the housing is a pressure roller under which the free end of the tape passes as it is applied to the film strips on platform 12, as hereinafter described. The free end of the tape may be held against pressure roller 52 by means of a leaf spring 54 which is secured as by screw 56 to housing 32.

In order to accurately limit the downward movement of the housing, a stop screw 58 may be mounted on the underside of the housing. Support arm 40 is preferably L-shaped with a horizontal portion 41 extending under the rear of the housing. Screws 49 and 54 may be mounted on support arm horizontal portion 41.

Positioned in the forward area of housing 42 is a tape cutting mechanism and handle mechanism which is indicated generally at 60.

Mechanism 60 includes a U-shaped cover plate 62 which includes a front section 62a, disposed in front of housing front wall 36, and a pair of integral side flanges 62b, disposed outwardly adjacent the forward portions of housing sidewalls 34.

Cover plate 62 is maintained against housing 32 by means of a generally L-shaped retainer bracket 64 which includes a horizontal top section 64a and an integral, vertical front section 64b. Top section 64a may be secured to top wall 39 of the housing by means of screws 65. At its lower end front section 64b has an end section 66 which is inturned rearwardly a slight distance to slidingly engage the front of cover plate 62 and prevent it from moving forwardly off of the housing, although at the same time permitting the cover plate to slide up and down relative to the housing front wall.

Positioned between housing front wall 36 and cover plate front section 62a and secured to the latter for vertical movement therewith is a vertically disposed knife 68 having a cutting edge 68a at its lower end.

Movement of the knife and attached cover plate is accomplished by a handle 70 including a bracket 72 which is secured to both the cover plate and knife by one or more screws 74.

It will be seen in FIG. 7 that at least one of screws 74 is longer than the combined thicknesses of handle bracket 72, cover plate 62, and knife 68 so that its free end projects into the housing through a vertical slot 76 in housing front wall 36. The purpose of screw 74 extending into the housing is for engagement with the upper end of a generally vertically disposed knife latch or lock bar 80 which is pivotally mounted within the housing on pin 81 for limited movement in a vertical plane. The upper end of lock bar 80 is normally urged into engagement with screw 74, to prevent that vertical movement of the knife, cover plate, and handle in a downward direction, by a spring 82 mounted within the housing. At its lower end knife lock bar 80 is provided with a cam pin 83, the purpose of which is hereinafter described.

Mounted on track 20 are a pair of rear and front stop bracket 90 and 94 which serve to limit the forward and rearward movements, respectively, of the carriage and which also serve other purposes, as hereinafter described.

Rear stop bracket 90, as best seen in FIGS. 2A and 9, includes an upper portion 91 and a lower portion 92, the latter of which has extending laterally therefrom a pin 93.

FRont stop bracket 94 includes an upper portion 95 and a lower portion 96.

Although knife 68 is held in its uppermost position by lock bar 80 when engaged therewith, knife 68 is at all times urged to its lowermost or cutting position by a spring 84 which is connected at its upper end to rear wall pin 85 and at its lower end to cover plate 62 as at 84.

To describe the operation of the device, although the tape-applying mechanism can be used to apply tape to various articles or material, one particular application for which the mechanism is well suited is in a film splicing device, as illustrated.

In order to effect a splice of adjacent ends of a pair of film strips F, the strips are first placed on the sections 12a of the platform and their jagged ends are trimmed.

As best seen in FIG. 3, the platform sections may be employed as cutters as their adjacent edges 12b cooperate in a scissorlike action.

After the trimmed ends of the strips are placed in abutting end-to-end relation on the platform and secured in place by clamps 16, the tape can be applied across the upper surface of the film as illustrated in FIG. 2C.

At the start of the tape applying cycle carriage 22 is in its rearmost position, as shown in FIGS. 1 and 2, and operating member 30 is held in its raised position by lock bar 42 which is in engagement with rear element 24b of the carriage.

In order to start the tape applying cycle the handle is pulled forward causing the carriage and attached operating member to move forward until cam pin 47 on lock bar 42 engages the rear vertical edge of upper section 91 of rear stop member 90, as seen in FIG. 2A. This causes lock bar 42 to rotate in a clockwise direction about its upper end pivotal connection to ear 44, with the result that the lower end of the lock bar moves to the left, as seen in FIG. 2A so that foot 46 becomes disengaged from rear element 24b of the carriage permitting the operating member to move downwardly about its pivotal axis on roller 27.

At this point the carriage is almost at its forwardmost location. Final forward movement of the carriage occurs when rear roller 27 of the carriage strikes pin 93 on the lower portion of stop member 90. It will be understood that these two actions occur at almost the same time, but the camming action and release of lock bar 42 occurs immediately prior to the contact between roller 27 and pin 93.

At this point the operating member is at its forwardmost position with the free end of the tape T over the forward edge of the film strips F. It will be understood that rear stop 90 is adjustable secured to track 20 so its position can be changed as required to provide for the application of various predetermined lengths of tape.

As the operating member reaches its forwardmost position the continued forward and downward force on handle 70 causes the operating member, which is no longer locked in its raised position, to drop to its lowermost or tape applying position, as shown in FIG. 2B. The elevation of the operating member can be accurately adjusted by adjusting screw 58 on the housing.

As the operating member is lowered over platform 12, the free forward end of the tape is applied to the forward edge of the film strips.

At this point a rearward force is applied to the operating member handle causing the operating member and carriage to move rearwardly on the track. As this occurs pressure roller 52 causes the tape to be firmly applied from front to rear across the upper surface of the film strips, as the operating member moves from the position of FIG. 2B to the position of FIG. 2C.

All this knife 68 is held in its uppermost position by lock bar 80.

The operating member and carriage move rearwardly to continue to apply the tape until front roller 26 of the carriage engages the front vertical surface of lower portion 96 of front stop 94, as best seen in FIGS. 2C and 8.

When the carriage and operating member are thereby stopped in their rearwardmost position it will be noted that knife 68 is directly over and aligned with the rear edge of the film strips on the platform.

At the same time the rearward motion of the carriage and operating member is stopped, as previously described, a second motion occurs almost simultaneously, namely, the release of knife lock bar 80.

Release of knife lock bar 80 is caused when pin 83 on the lower end of bar 80 contacts the front vertical edge of upper portion 95 of front stop 94. This causes lock bar 80 to rotate in a clockwise direction about pin 82 so the upper end of lock bar 80 becomes disengaged from screw 70.

When this occurs a combination of the downward force on the handle, gravity, and the action of spring 84 cause the rapid downward motion of knife 68 which severs the tape at the rear edge of the film strips on the platform to complete the operating cycle and effect a splice of the film strips.

After the cycle has been completed the handle is raised and the operating member lock bar foot is urged under rear element 24b by the action of spring 48.

Thus, the apparatus is then in the position shown in FIGS. 1 and 2, and a new operating cycle can be started.

I claim:

1. In a device for applying a portion of adhesive tape from the free end of a roll of adhesive tape to one surface of an article and then severing said portion from said roll, comprising, in combination:
   a. a stationary base for supporting said article in a fixed position;
   b. a carriage mounted on said base for horizontal movement toward and away from said article;
   c. an operating member mounted on said carriage for horizontal movement therewith and for vertical movement relative thereto;
   d. means for moving said member and said carriage between tape-applying and tape-severing stations;
   e. said member including:
      i. means for carrying said roll of tape;
      ii. means for applying said tape directly onto said article as said member is moved from said tape-applying station toward said tape-severing station;
      iii. means for severing said tape when said member reaches said tape-severing station;
   e. means for automatically actuating said tape-applying means as said member is moved from said tape-applying station toward said tape-severing station;
   f. means for automatically actuating said tape-severing means as said member is moved into said tape-severing station.

2. A device according to claim 1, wherein said platform includes a pair of relatively movable sections having adjacent side edges capable of cooperating in a scissorlike action to cut said article.

3. A device according to claim 1, wherein said carriage includes a frame and rollers engageable with a track on said base.

4. A device according to claim 1, wherein said operating member includes a boxlike housing having:
   a. an arm depending from a lower rear portion thereof and pivotally connected to said carriage; and
   b. a handle projecting from an upper front portion thereof.

5. A device according to claim 4, wherein said handle is operatively connected to said tape-severing means.

6. A device according to claim 1, wherein said tape-severing means includes a vertically disposed knife slidably mounted in a forward portion of said operating member.

7. A device according to claim 1, and including spring means urging said severing means into operative position.

8. A device according to claim 1, and including means on said base engageable with means on said carriage for stopping the forward and rearward movements of the carriage in said predetermined positions.

9. In a device of splicing motion picture film or the like by applying a strip of adhesive tape from roll stock across a pair of aligned abutting ends of film strips, the combination of:
   a. a base;
   b. a stationary platform on the base for holding said film strips in a fixed position;
   c. a carriage mounted on said base for horizontal movement toward and away from said platform;
   d. an operating member hingedly mounted on said carriage for horizontal movement therewith and for vertical movement relative thereto in a vertical plane aligned with the direction of movement of said carriage between inoperative upper and operative lower tape-applying positions;
   e. said operating member including:
      i. means for carrying a roll of adhesive tape;
      ii. means for applying a length of tape from the free end of said roll directly to only the upper surface of said film strips;
      iii. means, movable vertically between inoperative upper and operative lower tape-severing positions, for severing said length of tape from said roll at a side edge of said film strips;
   f. first releasable locking means for locking said operating member in an operative position;
   g. means for automatically releasing said first locking means when said operating member and carriage are moved forwardly to a predetermined position relative to the strips on said platform;
   h. second releasable locking means for locking said severing means in an inoperative position;
   j. means for automatically releasing said second locking means when said operating member and carriage are moved rearwardly to a predetermined position relative to the strips on said platform.

10. A device according to claim 9, wherein said first locking means includes a latch bar pivotally connected to said operating member and having a portion removably engageable with a portion of said carriage.

11. A device according to claim 10, wherein said means for releasing said first locking means includes an element on said latch bar engageable with an element on said base, as said carriage is moved forward to said predetermined position.

12. A device according to claim 10, including spring means urging said latch bar into locking position.

13. A device according to claim 9, wherein said second locking means includes a latch bar pivotally connected to said operating member and having a portion removably engageable with a portion of said severing means.

14. A device according to claim 13, wherein said means for releasing said second locking means includes an element on said latch bar engageable with an element on said base, as said carriage is moved rearwardly to said predetermined position.

15. A device according to claim 13, and including spring means urging said latch bar into locking position.